Dec. 8, 1959 W. A. CRANE ET AL 2,916,148
FILTER TANK CLEANING DEVICE
Filed Oct. 23, 1957
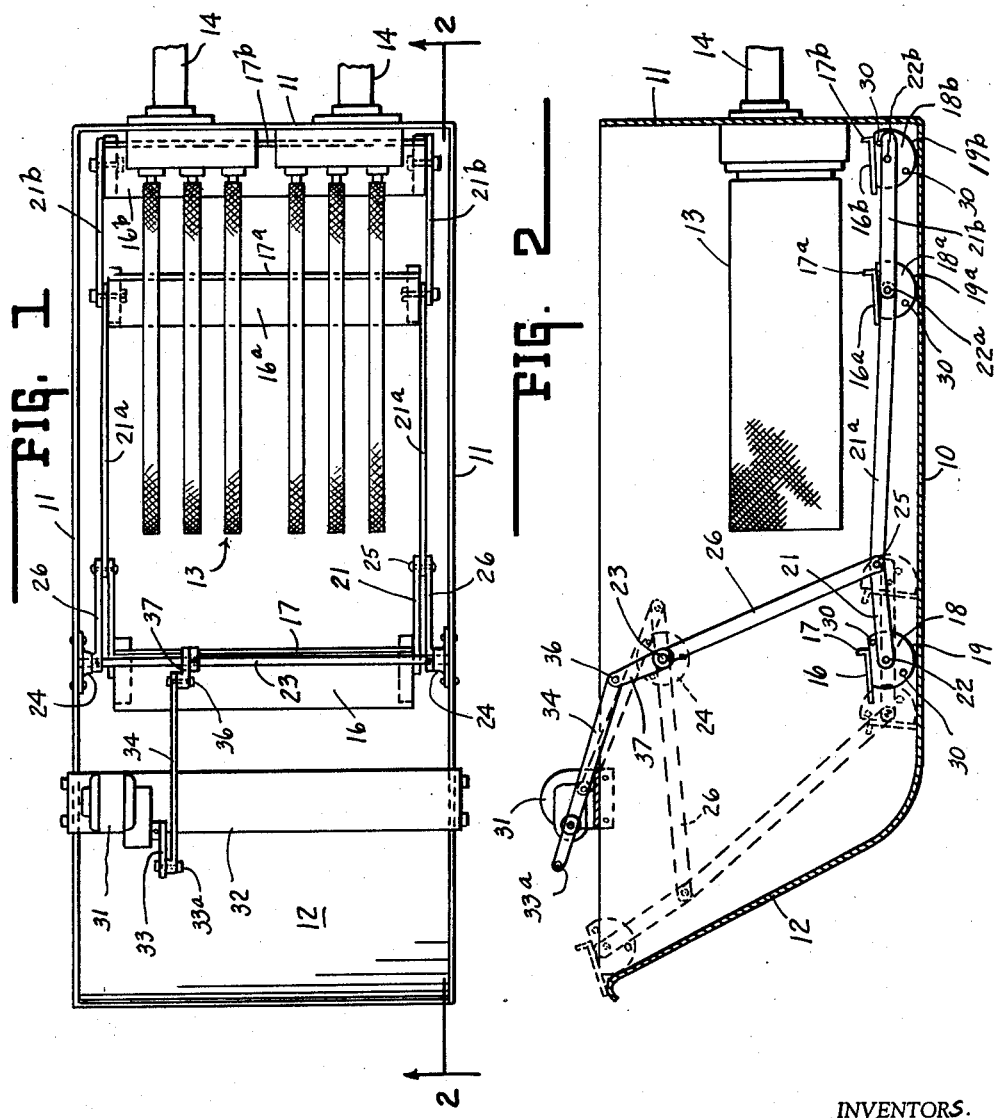
INVENTORS.
WILLIAM A. CRANE.
PAUL R. HONAN.
BY
Lockwood, Galt, Woodard & Smith
ATTORNEYS

# United States Patent Office 2,916,148
Patented Dec. 8, 1959

2,916,148

FILTER TANK CLEANING DEVICE

William A. Crane and Paul R. Honan, Lebanon, Ind., assignors, by mesne assignments, to Indiana Commercial Filters Corporation, Lebanon, Ind., a corporation of Indiana Application October 23, 1957, Serial No. 691,887

4 Claims. (Cl. 210—527)

This invention relates generally to a means for removing the deposit from a filter tank and in particular to a tank cleaning assembly which is adapted for use with a vacuum type liquid filter tank having an inclined sidewall.

Filtering tanks of the type referred to above are commonly used in filtering systems for filtering and reclaiming liquids such as cooling and cutting lubricants, washing solvents, and wastage from paper mill operation and the like. In such filtering systems there is provided a filtering tank having mounted therein filters adapted to remove solids held in suspension by the liquid and in case of cooling and cutting lubricants, for example, the system includes pumping means connected with the tank or the filter for circulating the fluid between the metal working machine and the filter whereby the liquid may be used over and over again. Filtering systems of this type include means for backwashing the filter to remove accumulated solids whereby they settle to the bottom of the filter tank. There is also a certain amount of settling out of solids from the fluid while it is in the tank. Various means have been provided for extracting settled solids from the tank, one such means comprising scraping blades carried by an endless chain which is caused to traverse the bottom and one side of the tank.

The principal object of the present invention is to provide a simplified, cylically operable apparatus for removing the settled solids from the tank bottom and transporting them to the exterior of the tank.

Another object of the present invention is to provide scraping elements which are moved through a primary stroke and a return stroke, with the scraping blades being automatically moved into scraping position during the initial portion of the primary stroke and automatically moved out of scraping position during the return stroke.

Still another object of the invention is to provide cyclically operable scraping elements within a filter tank having at least one inclined sidewall, one of the elements being moved over the inclined sidewall and the other element being simultaneously moved over the tank bottom wall to accumulate residue at the junction of the tank bottom wall with the inclined sidewall, the excursion of the first-mentioned element over the tank sidewall serving to transport to a point exterior of the tank the residue accumulated during the preceding cycle.

These and other features of the invention will be made apparent as the description proceeds with reference to the accompanying drawings in which:

Fig. 1 is a top plan view of a filter tank incorporating an embodiment of the present invention, and Fig. 2 is a sectional view taken generally along the line 2—2 of Fig. 1.

Referring to the drawings, there is shown a filter tank having a bottom wall 10, vertically extending sidewalls 11, and an inclined sidewall 12 which is joined to the bottom wall at an obtuse angle. A conventional filter assembly indicated at 13 is secured to one of the tank sidewalls and is provided with dual outlet connections 14 which extend exteriorly of the tank. The filter tank may have an open top through which liquid to be filtered may be introduced into the tank to a level above the filter assembly. The filter assembly outlet connections may communicate with a suction type pump (not shown) which serves to draw the liquid from the tank and through the filter assembly. During such operation of the filtering system, the filtered residue will accumulate upon the exterior surfaces of the filter assembly.

After operation of the filtering system for a predetermined time, the flow of filtered liquid through the connections 14 may be reversed to backwash the filter assembly, thereby breaking the accumulated residue away from the filter units of the assembly. The residue thus broken away thereupon settles to the bottom of the tank from whence it must subsequently be removed.

The assembly for removing such residue from the tank and embodying the present invention will now be described.

This assembly includes a scraping element comprising a blade 16 extending across the tank and formed so as to provide an extending flange 17 along the margin opposite its scraping edge. At each of its extremities the blade is provided with members 18 each of which presents an arcuate or semi-circular bearing surface 19 to the tank bottom wall.

Similar additional scraping elements are also disposed across the bottom of the tank and includes blades 16a and 16b having marginal flanges 17a and 17b respectively. Members 18a and 18b each present an arcuate bearing surface 19a and 19b to the tank bottom wall. The scraping elements carrying blades 16 and 16a are joined by an articulated linkage consisting of members 21 and 21a, pivotally joined at 25. The free end of the member 21 is pivotally joined to the forward scraping element by means of pin 22 journaled in an appropriate aperture in the member 21. The free end of the member 21a is pivotally joined to the intermediate scraping element by means of pin 22a journaled in an appropriate aperture in the member 21a. Member 21b, also pivoted on pin 22a, serves to join the trailing scraping element to the assembly, being pivotally connected to said element by means of pin 22b.

Each of the members 18, 18a and 18b carry outwardly-extending spaced pins 30 which are adapted to contact the upper and lower margins of the adjacent linkage members to define the horizontal and upright positions respectively of the scraping blades. While the foregoing description of the members 18, 18a and 18b and the connecting linkage has referred to these components in the singular, it will be evident from Fig. 1 that each of the elements described has its counterpart, similarly numbered, on the opposite side of the tank.

A rockshaft 23 is rotatably supported across the filter tank by means of bearing flanges 24 mounted on the inner face of the tank sidewalls. A pair of arms 26 are carried by the rockshaft and keyed thereto for angular displacement as the rockshaft is rotated. The arms 26 extend from the rockshaft within the tank, adjacent the sidewalls thereof, and, at their lower extremities pivotally accommodate the pins 25.

The means for angularly oscillating the articulated arms within the tank includes a drive element which may take the form of an electric motor 31 suitably mounted upon plate 32 which spans the top of the filter tank. The motor drives a linkage mechanism comprising a crank 33, pivoted at 33a to a connecting rod 34 which, at its opposite extremity, is pivotally connected at 36 to a crank arm 37. The crank arm is suitably keyed to the rockshaft 23 so that upon rotation of the crank 33 by the motor, the rockshaft, and consequently the arms 26, will be angularly oscillated.

In operation, tank 11 serves as a fluid reservoir wherein the level of the fluid normally is above the upper edges of the filters 13. Where the system is used for filtering cutting or lubricating fluids, there is a substantial amount of powdered metal suspended within the fluid. As a result a substantial amount of these metal particles will settle to the bottom 10 of the tank. As mentioned herein, the filtering system may be controlled to backwash the filters 13 so as to cause removal of metallic particles which may have accumulated on the exterior surfaces of the filters 13. When such backwashing occurs a substantial quantity of metallic particles settles immediately to the bottom 10 of the tank. Accordingly there is constant accumulation of filtered solid material on the bottom of the tank which must be removed at regular intervals, particularly where the fluid being filtered is used for cooling or lubricating metal working tools.

In order to effect removal of accumulated solids from the bottom of tank 10, the motor 31 may be run continuously during the filtering operation or it may be started intermittently by manually or automatically operated switching means thereby to cause angular oscillation of the articulated arms 26.

As shown in Fig. 2, the crank 33 rotates in a clockwise direction, and, assuming that the starting position for the scraping elements is as shown by solid lines in Fig. 2, the arms 26 will initially move to the left. Such initial movement will cause the members 18, 18a and 18b to rotate counterclockwise about pins 22, 22a and 22b respectively because of the frictional engagement of bearing surfaces 19, 19a and 19b with the tank bottom. Blades 16, 16a and 16b move from their solid line positions of Fig. 2 into scraping or upright position (shown in broken lines in Fig. 2) wherein their scraping edges are adjacent to the tank bottom wall.

As the arms 26 move beyond this initial phase toward their broken line position of Fig. 2, the blade 16, in scraping position, will be caused to move upwardly on the inner face of the inclined sidewall 12. The blades 16a and 16b, in scraping position, will simultaneously be caused to move over the inner surface of the tank bottom wall, scraping accumulated settlings before them. In moving to its broken line position of Fig. 2, the blade 16 will push before it any settled material which has previously accumulated at the junction of the bottom wall 10 and the inclined wall 12. At the terminus of this leftward movement of the assembly, the material transported up the inclined sidewall by the blade 16 will be dumped over the curved lip of the tank and may be caught within a suitable receptacle (not shown).

During the initial portion of the return stroke the scraping elements carrying the blades 16a and 16b will roll about the arcuate surfaces 19a and 19b, moving the blades out of scraping position. The remainder of the return stroke will slide the members 18a and 18b along the bottom wall until the solid line position of Fig 2 is again reached. As the blades 16a and 16b retreat from their broken line position of Fig. 2, the residue accumulated in front of the blade 16a will be deposited adjacent the junction of the tank bottom wall and the inclined sidewall, and the residue in front of blade 16b will be deposited midway along the bottom wall. During the return stroke, just described, the scraping element carrying the blade 16 will be rotated about the arcuate surfaces 19, elevating the blade 16 to an inactive position, and will be drawn back into the tank along the inclined sidewall and returned to its solid line position of Fig. 2. During this return movement blade 16 will pass over accumulated settlings at the junction of walls 10 and 12 and blade 16a will pass over the settlings accumulated midway along the bottom wall of the tank.

On the next forward stroke of the articulated arms, the blade 16 will transport up the inclined sidewall and over the upper margin thereof, the settlings accumulated at the junction of the bottom wall and sidewall 12 during the previous cycle. Similarly the blade 16a will transport to the juncture of the inclined sidewall and the bottom wall the settlings accumulated midway on the tank bottom wall be the blade 16b in the previous cycle. As long as the tank cleaning operation continues, continued angular oscillation of the arms 26 will cause the blade 16b to transfer residue to the blade 16a which in turn deposits this accumulation at the junction of the sidewall 12 and bottom wall 10, with the blade 16 transporting the settlings so deposited up the inclined sidewall to the exterior of the tank. It will be understood that further scraping elements may be attached beyond the trailing element, or only the two elements carrying blades 16 and 16a could be utilized, the choice depending upon the size of the tank in which the apparatus is to be operated.

While the invention has herein been described with reference to a vacuum type filter system in which the residue broken from the filter unit is deposited at the bottom of the tank, it will be understood that the apparatus shown herein may be used in other filtering or separating systems, such as those in which the residue is recovered by permitting it to settle from a static liquid.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a tank having an inclined sidewall joined at an obtuse angle with a flat bottom wall, an assembly for removing deposited material from the bottom wall and delivering it exteriorly of the tank, said assembly comprising scraping elements spaced apart by members pivotally joined to each of said elements, one of said elements normally being positioned adjacent the juncture of said bottom wall and said inclined sidewall, the other of said elements normally being positioned rearwardly on the bottom wall, each of said elements including a scraping blade having arcuate bearing surfaces normally supporting the blades on the bottom wall out of scraping position, said arcuate bearing surfaces rolling said blades into scraping position upon movement of said elements across said bottom wall, and means for angularly oscillating said assembly to thereby move said one element into scraping position and over said inclined sidewall as said other element moves in scraping position over said bottom wall, the return stroke of said assembly repositioning said elements out of scraping position upon said bottom wall, the excursion of said other element accumulating deposit at the juncture of said inclined sidewall and said bottom wall and the excursion of said one element transporting to the exterior of the tank the accumulated deposit of the preceding cycle.

2. In a tank having an inclined sidewall joined at an obtuse angle with a flat bottom wall, an assembly for removing deposit from the bottom wall and delivering it exteriorly of the tank, said assembly comprising spaced scraping elements, one of said elements initially being positioned adjacent the juncture of said bottom wall and said inclined sidewall, the other of said elements initially being positioned rearwardly on the bottom wall, each of said elements including a scraping blade having arcuate bearing surfaces supporting the blades on the bottom wall out of scraping position, said arcuate bearing surfaces rolling said blades into scraping position upon movement of said elements across said walls, and means for angularly oscillating said assembly within the tank to thereby move said one element into scraping position and along and beyond said inclined sidewall as said other element moves in scraping position over said bottom wall, the return stroke of said assembly repositioning said elements out of scraping position upon said bottom wall, the excursion of said other element accumulating deposit at the juncture of said inclined sidewall and said bottom wall and the excursion of said one element transporting to the exterior of the tank the accumulated deposit of the preceding cycle.

3. In a tank having an inclined sidewall joined at an obtuse angle with a flat bottom wall, an assembly for removing deposit from the bottom wall and delivering it exteriorly of the tank, said assembly comprising spaced scraping elements, one of said elements being positioned adjacent the juncture of said bottom wall and said inclined sidewall, each of said elements including a scraping blade and means supporting the blades on the bottom wall out of scraping position, said means moving said blades into scraping position upon movement of said elements across said bottom wall, and means for oscillating said assembly to thereby move said one element into scraping position and along and beyond said inclined sidewall as said other element moves in scraping position over said bottom wall, the return stroke of said assembly repositioning said elements out of scraping position upon said bottom wall, the excursion of said other element accumulating deposit at the juncture of said inclined sidewall and said bottom wall and the excursion of said one element transporting to the exterior of the tank the accumulated deposit of the preceding cycle.

4. In a tank having therein an inclined surface joined at an obtuse angle with a flat bottom wall, an assembly for removing deposit from the bottom wall and delivering it beyond said inclined surface, said assembly comprising spaced scraping elements, one of said elements being positioned adjacent the juncture of said bottom wall and said inclined surface, each of said elements including a scraping blade and means supporting the blades on the bottom wall out of scraping position, said means moving said blades into scraping position upon movement of said elements across said bottom wall, and means for oscillating said assembly to thereby move said one element into scraping position and along and beyond said inclined surface as said other element moves in scraping position over said bottom wall, the return stroke of said assembly repositioning said elements out of scraping position upon said bottom wall, the excursion of said other element accumulating deposit at the juncture of said inclined surface and said bottom wall and the excursion of said one element transporting beyond said inclined surface the accumulated deposit of the preceding cycle.

References Cited in the file of this patent
UNITED STATES PATENTS

| | | |
|---|---|---|
| 1,918,742 | Elrod | July 18, 1933 |
| 2,099,654 | Lund | Nov. 16, 1937 |
| 2,494,534 | Armstrong | Jan. 17, 1950 |
| 2,552,743 | Simpson | May 15, 1951 |
| 2,559,614 | Hapman | July 10, 1951 |
| 2,785,791 | Cordis | Mar. 19, 1957 |